United States Patent Office 3,180,879
Patented Apr. 27, 1965

3,180,879
3 - (AMINO/DIALKYLAMINO) - 3 - CYANO - 5α-ANDROSTAN - 17β - OLS AND ESTERS, AND INTERMEDIATES THERETO
Richard E. Ray, Morton Grove, and Kurt J. Rorig, Glenview, Ill., assignors to G. D. Searle & Co., Chicago, Ill., a corporation of Delaware
No Drawing. Filed May 16, 1963, Ser. No. 281,047
3 Claims. (Cl. 260—397.5)

This invention relates to 3-aminated 17-oxygenated 3-cyanoandrostanes and processes for the manufacture thereof. More particularly, this invention provides new and useful chemical compounds of the formula

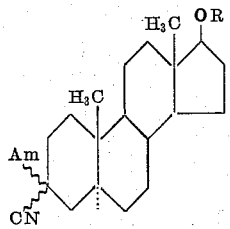

wherein R represents hydrogen or an alkanoyl radical and Am represents an optionally-alkylated amino radical.

Among the alkanoyl radicals represented by R, especially lower alkanoyl radicals are preferred, which is to say radicals of the formula

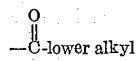

Illustrative of the lower alkyl grouping called for are methyl, ethyl, propyl, isopropyl, butyl, isobutyl, sec-butyl, tert-butyl, pentyl, neopentyl, hexyl, isohexyl, heptyl, and like monovalent, saturated, acyclic, straight- or branched-chain hydrocarbon groupings of the formula

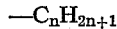

wherein $n$ is a positive integer less than 8.

Am in the generic formula for compounds of this invention subsumes both the primary amino radical, —NH$_2$, and tertiary amino radicals resulting from the substitution of 2 alkyl radicals therein. Optimally although not necessarily exclusively adapted to such substitution are alkyl radicals containing fewer than 5 carbon atoms, i.e., methyl, ethyl, propyl, and the variously isomeric butyl radicals hereinabove contemplated.

Equivalent to the foregoing basic amines for the purposes of this invention are corresponding acid addition salts of the formula

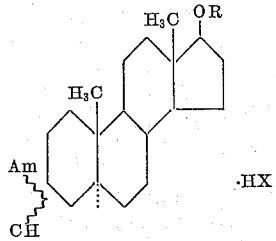

wherein R and Am have the meanings previously assigned and X represents one equivalent of an anion—for example, chloride, bromide, iodide, nitrate, phosphate, sulfate, sulfamate, methyl sulfate, ethyl sulfate, benzenesulfonate, toluenesulfonate, acetate, lactate, succinate, malate, maleate, tartrate, citrate, gluconate, ascorbate, benzoate, cinnamate, and the like—which, in combination with the cationic portion of the salt aforesaid, is neither pharmacologically nor otherwise undesirable in pharmaceutical dosage.

The compounds to which this invention relates are useful by reason of their valuable pharmacological properties. Thus, for example, they are anabolic and androgenic agents. It follows that the intermediates, whence these compounds derive are likewise valuable.

Manufacture of the primary amines hereof proceeds by contacting an appropriate androstanone

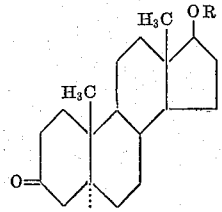

(R being defined as before) with potassium cyanide and ammonium chloride in cold aqueous ethanol. The amine so produced is admixed with the corresponding cyanohydrin, from which it is separated by dissolution in propanolic hydrogen chloride. Additional amine is obtained by saturating a cold methanol solution of the cyanohydrin with ammonia.

The tertiary amines hereof are obtained by melting an appropriate androstanone

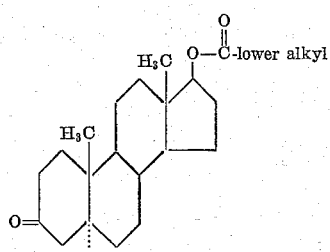

and contacting the melt during several hours with an appropriate alkylamine, dissolving the resultant 3-alkylimino derivative in dichloromethane and adding a corresponding alkyl iodide to quaternize the nitrogen, dissolving the quaternary imine in acetonitrile and mixing the solution with aqueous potassium cyanide to give the tertiary amino 17-ester, and hydrolyzing the ester grouping with aqueous methanolic hydrogen chloride.

Conversion of the amine bases hereof to acid addition salts is accomplished by simple mixing of a base with 1 equivalent of any of various inorganic and strong organic acids, the anionic portion of which conforms to X as hereinabove defined.

The following examples describe in detail compounds illustrative of the present invention and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted.

*Example 1*

A. *3-cyano-5α-androstane-3,17β-diol.*—To a solution of 100 parts of 17β-hydroxy-5α-androstan-3-one in 1200 parts of anhydrous alcohol at 0–5° is added, with agitation, a solution of 22 parts of potassium cyanide and approximately 18 parts of ammonium chloride in 200 parts of water. The resultant mixture is allowed to warm to room temperature during agitation for 3 hours, whereupon it is chilled to 0–5° and diluted with 3 volumes of cold water. The insoluble solids thrown down are filtered off, washed with water, and suspended in 400 parts of 2-propanol. Approximately 80 parts of a 40% solution of hydrogen chloride in 2-propanol is introduced. The resultant mixture is maintained with agitation for 5 minutes, then diluted with 3 volumes of water. The insoluble solids are 3-cyano-5α-androstane-3,17β-diol which, filtered off and dried in air, melts at 210–213°.

B. *3-amino-3-cyano-5α-androstan-17β-ol.*—The filtrate deriving from isolation of 3-cyano-5α-androstane-3,17β-diol in the foregoing Part A of this example is neutralized with sodium hydroxide. The insoluble solids thrown down, filtered off and successively recrystallized from methanol and acetone, afford 3-amino-3-cyano-5α-androstan-17β-ol, melting at 150–164° and further characterized by a specific rotation, referred to the D line of sodium and at 26° in methanol solution, of +19°. The product has the formula

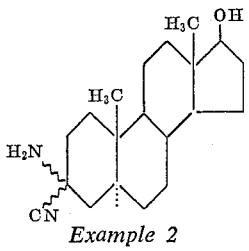

*Example 2*

*3-amino-3-cyano-5α-androstan-17β-ol.*—A solution of 10 parts of 3-cyano-5α-androstane-3,17β-diol in 80 parts of methanol at 0–5° is saturated with ammonia gas. The product thrown down is 3-amino-3-cyano-5α-androstan-17β-ol, which is filtered off and recrystallized as described in Example 1B.

*Example 3*

A. *17β - acetoxy - 3 - cyano - 5α - androstan - 3 - ol.*—Substitution of 113 parts of 17β-acetoxy-5α-androstan-3-one for the 17β-hydroxy-5α-androstan-3-one called for in Example 1A affords, by the procedure there detailed, 17β-acetoxy-3-cyano-5α-androstan-3-ol.

B. *17β - acetoxy - 3 - amino - 3 - cyano - 5α - androstane.*—The filtrate deriving from isolation of 17β-acetoxy-3-cyano-5α-androstan-3-ol in the foregoing Part A of this example is neutralized with sodium hydroxide. The insoluble solids thrown down are filtered off and dried in air. The product thus isolated is 17β-acetoxy-3-amino-3-cyano-5α-androstane having the formula

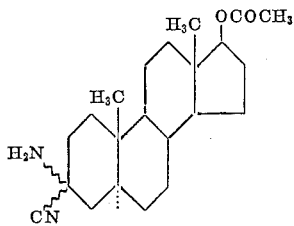

*Example 4*

A. *17β - acetoxy - 3 - methylimino - 5α - androstane.*—Methylamine is passed into (molten) 17β-acetoxy-5α-androstan-3-one at approximately 150° during vigorous agitation over a period of 5 hours. The resultant mixture is cooled to room temperature and thereupon taken up in dichloromethane. The dichloromethane solution, washed with water, dried over anhydrous sodium sulfate, and stripped of solvent, affords 17β-acetoxy-3-methylimino-5α-androstan as a viscous oil.

B. *17β - acetoxy - 3 - methylimino - 5α - androstane methiodide.*—To a solution of 19 parts of 17β-acetoxy-3-methylimino-5α-androstane in approximately 120 parts of dichloromethane is added 140 parts of methyl iodide. The resultant mixture is allowed to stand at room temperatures for 3½ hours, then poured into approximately 500 parts of ether. Insoluble solids are 17β-acetoxy-3-methylimino-5α-androstane methiodide, which is promptly isolated by filtration.

C. *17β - acetoxy-3-cyano-3-dimethylamino - 5α - androstane.*—A solution of approximately 20 parts of 17β-acetoxy-3-methylimino-5α-androstane methiodide in approximately 360 parts of acetonitrile is poured into a solution of 11 parts of potassium cyanide in 200 parts of water. The resultant mixture is maintained with agitation at room temperatures for 40 minutes, then poured into 3000 parts of ice water. The mixture thus obtained is maintained with agitation for 15 minutes, then filtered. The light tan powder thus isolated, recrystallized from a mixture of dioxane and water, affords 17β-acetoxy-3-cyano-3-dimethylamino-5α-androstane melting in the range 152–170°. The product has the formula

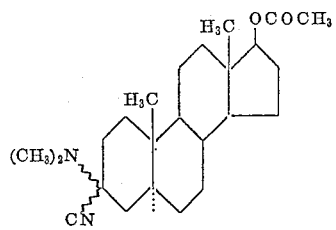

*Example 5*

*3-cyano-3-dimethylamino-5α-androstan-17β - ol.*—To a suspension of 50 parts of 17β-acetoxy-3-cyano-3-dimethylamino-5α-androstane in 200 parts of methanol is added a solution of 24 parts of concentrated hydrochloric acid in 50 parts of water. The resultant mixture is heated at the boiling point under reflux with agitation for 1 hour, then cooled and poured into 2500 parts of cold water. The precipitate thrown down is filtered off and dried in air. The product thus isolated is 3-cyano-3-dimethylamino-5α-androstan-17β-ol, having the formula

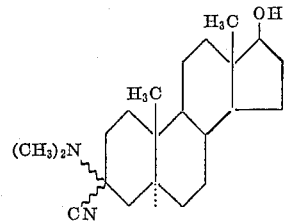

What is claimed is:
1. A compound of the formula

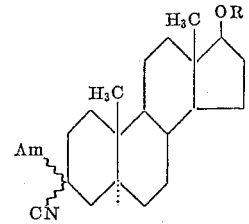

wherein R represents a member of the group consisting of hydrogen and a radical of the formula

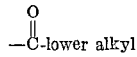

and Am represents a member of the group consisting of radicals of the formulas

—NH$_2$ and —N(C$_n$H$_{2n+1}$)$_2$ in which *n* represents a positive integer less than 5.
2. 3-amino-3-cyano-5α-androstan-17β-ol.
3. 17β - acetoxy-3-cyano-3-dimethylamino - 5α - androstane.

References Cited by the Examiner
UNITED STATES PATENTS 2,992,243  7/61  Ercoli _____ 260—397.4
3,025,309  3/62  Gianigiacomo _____ 260—397.4

LEWIS GOTTS, *Primary Examiner.*